United States Patent [19]

Walker et al.

[11] Patent Number: 5,289,566
[45] Date of Patent: Feb. 22, 1994

[54] VIDEO IMAGE CREATION

[75] Inventors: Ian C. Walker; Richard J. Taylor; Anthony D. Searby; Paul R. N. Kellar, all of Newbury, England

[73] Assignee: Quantel, Ltd., Newbury, England

[21] Appl. No.: 68,750

[22] Filed: May 28, 1993

Related U.S. Application Data

[63] Continuation of Ser. No. 723,728, Jun. 20, 1991, Pat. No. 5,216,755, which is a continuation of Ser. No. 444,776, Dec. 1, 1989, abandoned, which is a continuation of Ser. No. 211,064, Jun. 20, 1988, abandoned, which is a continuation of Ser. No. 947,096, Dec. 29, 1986, abandoned, which is a continuation of Ser. No. 761,305, Jul. 29, 1985, Pat. No. 4,633,416, which is a continuation of Ser. No. 641,544, Aug. 17, 1984, abandoned, which is a continuation of Ser. No. 326,293, Dec. 1, 1981, Pat. No. 4,514,818.

[30] Foreign Application Priority Data

Dec. 4, 1980 [GB] United Kingdom ............... 8038887

[51] Int. Cl.[5] .................. H04N 1/22; G09G 1/16
[52] U.S. Cl. ..................... 395/132; 395/131; 345/152; 345/179
[58] Field of Search .............. 395/131, 132, 129; 340/707, 703, 798

[56] References Cited

U.S. PATENT DOCUMENTS

| | | | |
|---|---|---|---|
| 1,360,085 | 3/1920 | Bradley | 206/568 |
| 2,565,912 | 5/1949 | Davis | 206/1.7 |
| 3,192,315 | 5/1962 | Remley . | |
| 3,441,722 | 4/1969 | Gloess | 235/151 |
| 3,672,742 | 7/1970 | Barg | 312/232 |
| 3,673,579 | 6/1972 | Graven | 340/173 |
| 3,832,485 | 8/1974 | Pieters | 178/6.8 |
| 3,835,245 | 9/1974 | Pieters | 178/6.8 |
| 3,936,636 | 2/1976 | Percival | 378/901 |
| 3,944,988 | 3/1976 | Mayer | 340/172.5 |
| 3,978,280 | 8/1976 | Kavanagh et al. | 178/6.8 |
| 4,017,680 | 4/1977 | Anderson et al. | 358/224 |
| 4,028,727 | 6/1977 | Skrydstrup | 358/181 |
| 4,070,710 | 1/1978 | Sukonick et al. | 364/900 |
| 4,129,747 | 12/1978 | Pepper, Jr. | 178/19 |
| 4,146,788 | 3/1979 | Mirkin et al. | 250/311 |
| 4,148,070 | 4/1979 | Taylor | 358/160 |
| 4,172,264 | 10/1979 | Taylor et al. | 358/185 |
| 4,189,743 | 2/1980 | Schure et al. | 358/93 |

(List continued on next page.)

FOREIGN PATENT DOCUMENTS

| | | |
|---|---|---|
| 2032217 | 4/1980 | United Kingdom . |
| 1570773 | 7/1980 | United Kingdom . |
| 1574173 | 9/1980 | United Kingdom . |
| 2055027 | 2/1981 | United Kingdom . |
| 1586169 | 3/1981 | United Kingdom . |
| 2062396 | 5/1981 | United Kingdom . |

OTHER PUBLICATIONS

INTELLECT, a new dimension in Image Processing and Synthesis, 14 pages, (Micro Consultants Limited), Feb. 1976.

Appel, A. et al., *IBM Technical Disclosure Bulletin*, vol. 24, No. 4, Sep. 1981, pp. 2013–2016.

Crow, F. C. et al., *Computer*, "Shaded Computer Graphics in the Entertainment Industry", Mar. 1978.

(List continued on next page.)

*Primary Examiner*—Roy N. Envall, Jr.
*Assistant Examiner*—Laura Brutman
*Attorney, Agent, or Firm*—Cooper & Dunham

[57] ABSTRACT

A video image creation system provides intensity or color data from one or more stores. The image is created under manual control which effectively defines the coordinates of the artists implement at any given time.

A processor receives the incoming image data and previously derived data from a frame store and modifies this data in dependance on a parameter available from another store. The created image can be viewed on a monitor.

The parameter controls the contribution made from any adjacent, previously created, parts of the image and can be such as to simulate different pencil or brush shapes or types of paint for example. Additional facilities such as pressure sensitivity and blurring can be provided.

9 Claims, 11 Drawing Sheets

U.S. PATENT DOCUMENTS

| | | | |
|---|---|---|---|
| 4,189,744 | 2/1980 | Stern | 358/93 |
| 4,198,539 | 4/1980 | Pepper, Jr. | 178/18 |
| 4,200,867 | 4/1980 | Hill | 340/703 |
| 4,232,311 | 9/1980 | Agneta | 345/22 |
| 4,240,104 | 8/1981 | Taylor et al. | 358/22 |
| 4,250,522 | 2/1981 | Seki et al. | 358/76 |
| 4,258,385 | 3/1981 | Greenberg et al. | 358/22 |
| 4,261,040 | 4/1981 | Weidman et al. | 364/554 |
| 4,280,138 | 7/1981 | Stock | 358/150 |
| 4,286,291 | 8/1930 | Taylor et al. | 358/138 |
| 4,292,649 | 9/1981 | Macheboeuf | 358/22 |
| 4,293,734 | 10/1981 | Pepper, Jr. | 178/18 |
| 4,302,011 | 11/1981 | Pepper, Jr. | 273/85 G |
| 4,318,096 | 3/1982 | Thornburg et al. | 345/179 |
| 4,329,710 | 5/1982 | Taylor | 358/81 |
| 4,334,245 | 6/1982 | Michael | 358/183 |
| 4,357,624 | 11/1982 | Greenberg | 358/22 |
| 4,360,831 | 11/1982 | Kellar | 358/183 |
| 4,384,338 | 5/1983 | Bennett | 395/163 |
| 4,418,390 | 11/1983 | Smith et al. | 364/526 |
| 4,459,677 | 7/1984 | Porter et al. | 395/275 |
| 4,475,161 | 10/1984 | Stock | 340/701 |
| 4,514,818 | 4/1985 | Walker | 395/129 |
| 4,524,421 | 6/1985 | Searby et al. | 395/131 |
| 4,564,915 | 1/1986 | Evans et al. | 340/701 |
| 4,602,286 | 7/1986 | Kellar et al. | 358/183 |
| 4,633,416 | 12/1986 | Walker | 395/131 |
| 5,216,755 | 6/1993 | Walker et al. | 395/132 |

OTHER PUBLICATIONS

Smith, A. R., "Tutuorial: Computer Graphics"; IEEE Computer Society, IEEE Inc., 1982, pp. 501-515.

Quantel Limited v. Spaceward Microsystems, High Court of Justice, Chancery Division, Patents Court, Dkt. No CH 1987 Q No. 8156 (Transcripts of Testimony & Oral Arguments).

Quantel Limited v. Spaceward Microsystems, High Court of Justice Chancery Division, Patents Court, Dkt. No. CH 1987 Q. No. 8156 (Litigation Documents).

Rivlin, History and Basic Concepts of Computer Graphics, Chapter 4, "The Digital Canvas, Two-Dimensional Animation and Paint and Programs", 1988.

Broadcast Management and Engineering, "NAB Show in Print . . . ", Jun. 1981, pp. 57-58.

Catmull, E., Computer Graphics, vol. 12, No. 3, "The Problems of Computer Assisted Animation", Aug. 1978, pp. 495-499.

Leonard, E., Society of Motion Picture and Television Engineers Journal, vol. 87, 1978, pp. 499-504.

Bresenham, J., IBM Systems Journal, vol. 4, No. 1, "Algorithm for Computer Control of a Digital Plotter", 1965, pp. 25-30.

Regnier, H. et al., Proceedings, International Broadcasting Convention, "Inactive Computer Graphics in Broadcast Environment", 1978.

Shoup, R., Digital Video, "Some Experiments in Television Graphics and Animation Using a Digital Image Memory", Mar. 1979.

Stern, G., "Soft Cel—An Application of a Raster Scan Graphics to Conventional Cel Animation", 1979.

Catmull, E., American Cinematographer, "New Frontiers in Computer Animation", pp. 100 et seq., Oct. 1979.

Barros, J. et al., "Generating Smooth 2-D Monocolor Line Drawings on Video Display", 1979.

Forrest, A., "On the Rendering of Surfaces", 1979.

Feibush, E. et al., "Synthetic Texturing Using Digital Filters", 1980.

Catmull, E., "Computer Animation—The State of the Art", 1980.

Levoy, M., "The Design and Implementation of a Large Scale Computer Assisted Cartoon Animation Production System", 1980.

Levoy, M., "Frame Buffer Configurations for Paint Programs", 1980.

Crow, F., IEEE CG&A, "A Comparison of Anti-Aliasing Techniques", Jan. 1981, pp. 40-48.

Gupta, S., et al., Computer Graphics, "Filtering Edges for Gray-Scale Displays", Aug. 1981, pp. 1-5.

Kajiya, J. et al., Computer Graphics, vol. 15, No. 3, "Filtering High Quality Text for Display on Raster Scan Devices", Aug. 1981, pp. 7-15.

Leedon, B., International Broadcast Engineer, vol. 12, "Ava-Ampex Video Art", Jul. 1981, pp. 8-10.

Tanton, N., International Broadcast Engineer, vol. 12, No. 178, "A Microprocessor-Based Tool for Graphic Design", Jul. 1981, pp. 12-13.

Black, P., "Broadcast Management and Engineering, Digital Art Paint Systems Are They Right For You?", Feb. 1982, pp. 67-74.

Borell, J., Computer Graphics World, "Digital Paint Systems", Apr. 1982, pp. 61-67.

Whitted, T., Computer Graphics, vol. 17, No. 3, "Anti-Aliased Line Drawing Using Brush Extrusion", Jul. 1983, pp. 151-156.

Lewis, J.-P., Computer Graphics, vol. 18, No. 3, "Textured Synthesis for Digital Painting", Jul. 1984, pp. 245-252.

Forrest, A., NATO ASI Series, Fundamental Alaithms for Computer Graphics, "Anti-Aliasing in Practice", 1985, pp. 113-134.

Strassman, S., Computer Graphics, vol. 20, No. 4, "Hairy Brushes", pp. 225-232 (1986).

Crow, F., State of the Art in Computer Graphics, "Anti-Aliasing", 1988.

Vol. 17, No. 3, "Edge Interference with Applications to Anti-Aliasing", Jul. 1983, pp. 157-162.

Lippke, J., BME's World Broadcast News, "Broadcasters' Latest Tool: Digital Art Systems".

Robertson, B., Computer Graphics World, "Paint", Apr. 1988.

Smith, S., Abacus, "Digital Filmmaking", 1983, pp. 28-45.

Waldman, C., Star and Sky, "Solar System Exploration by Computer Graphics", Mar. 1980, pp. 28-33.

Catmull, E., Computers for Imagemaking, "Computer Character Animation—Is it Possible", pp. 64-69.

Quantel Limited v. Shima Seiki Europe Limited, Chancery Division, Patents Court, Dkt. No. CH 1989 Q No. 10727 (Affidavits of John Henry Zimet).

VIDEO IMAGE CREATION

CROSS-REFERENCE TO RELATED APPLICATIONS

The present application is a continuation of application Ser. No. 07/723,728 filed on Jun. 20, 1991 now U.S. Pat. No. 5,216,755 which is a continuation of application Ser. No. 07/444,776 filed on Dec. 1, 1989 (now abandoned); which is a continuation of Ser. No. 07/211,064 filed on Jun. 20, 1988 (now abandoned); which is a continuation of Ser. No. 06/947,096 filed on Dec. 29, 1986 (now abandoned); which is a continuation of Ser. No. 06/761,305 filed on Jul. 29, 1985 (now U.S. Pat. No. 4,633,416); which is a continuation of Ser. No. 06/641,544 filed on Aug. 17, 1984 (now abandoned); which is a continuation of Ser. No. 06/326,293 filed on Dec. 1, 1981 (now U.S. Pat. No. 4,514,818).

BACKGROUND OF THE INVENTION

The invention relates to the creation of video images.

There are a number of standard computer peripherals available that permit "computer graphics" to be generated entirely electronically. These can take the form of vector or raster displays with the input means usually some form of touch tablet on which the operator can draw and see the results of this work in real time on the electronic display.

The system of particular interest to the broadcaster, amongst others, is that of the raster display configuration where the display itself can take the form of a normal colour TV screen and thus the video from the computer can be broadcast directly. The obvious use of such a system is to allow the graphics used so much in modern productions to be generated electronically rather than the traditional pencil and paper or "cut and stick" techniques that are both time consuming and expensive in materials.

STATEMENT OF PRIOR ART

A typical known electronic graphics system is shown in FIG. 1 comprising a touch tablet 10, a computer 12, a framestore 13 with associated colour generation RAMs 14-16 for the display 17. An artist draws with the stylus 11 of the touch tablet and the computer 12 registers the coordinates (x,y) of the stylus whilst remembering the selected colour with which the artist has chosen to draw. The computer then feeds the appropriate addresses to the framestore 13 where the pixel at that address is modified to hold the code corresponding to the chosen colour which it receives as incoming data. As the framestore is read at normal broadcast video rates then the lines, or pictures, drawn by the artist are visible on the display. It is found in practice that, providing the display is directly in front of the touch tablet, the fact that the artist is not watching his hand but the screen provides no problem. It is possible to use the computer to designate the stylus size so as to be several picture points in diameter for example so that the lines on the 'drawn' image will be of a designated width, as though drawn with a larger stylus. This is achieved by controlling the writing of data into the frame store so that adjacent picture points receive the incoming data also.

The colour for display is generated from the RAM stores 14-16 handling the Red, Green or Blue component respectively to generate the desired colour combination. (Equal amounts of R, G and B components will produce a monochrome image of a certain intensity.) If the data from frame store 13 is 8 bits wide, this will allow 256 different 'partial colour' combinations. The capacity of the RAMs is selected accordingly. The various colour parameters are fed into the RAMs from the computer and can be updated as desired. During normal operation the RAMs operate as ROMs in dependence on the frame store output.

Now the system described represents a fairly common application of digital techniques and there are already a number of such units available.

In the system as described, the path from the touch tablet to the framestore and the display via the computer is all unidirectional, since the computer only writes to the framestore and does not read from it (and in such a system makes no use of the information held in the framestore).

The type of pictures drawn with such a machine can be of very high quality but cannot fall into the category of "fine art", or, put another way, they are more impressionistic than realistic. This is caused by the nature of the hard "electronic" lines being a far cry from the textures and tonal qualities of the more conventional artists tools.

This electronic nature of the pictures is further emphasised by the fact that existing systems are 'partial' colour (as shown) systems rather than 'full' colour, that is to say, the framestore only has 256 possible combinations in each pixel and a colour can be allocated to each combination. Thus only 256 hues, saturations or luminance levels are possible on the screen for any given picture. Any true pictorial representation of a scene would have far more combinations than this.

OBJECT OF THE INVENTION

The system of the present invention seeks to arrive at a much closer electronic analogy of the normal artists tool in order that the operator might still move the stylus but that the results on the screen make it appear he is genuinely working with a pencil, paint brush, or other implement.

SUMMARY OF THE INVENTION

According to the invention there is provided a video image creation system comprising means for providing image data pertaining to at least one picture point allocated to a designated coordinate location and processing means for processing the image for each designated coordinate location from both current and previously derived image data.

BRIEF DESCRIPTION OF THE DRAWINGS

The invention will now be described by way of example with reference to the accompanying drawings, in which.

DESCRIPTION OF PREFERRED EMBODIMENT

Figure 1:
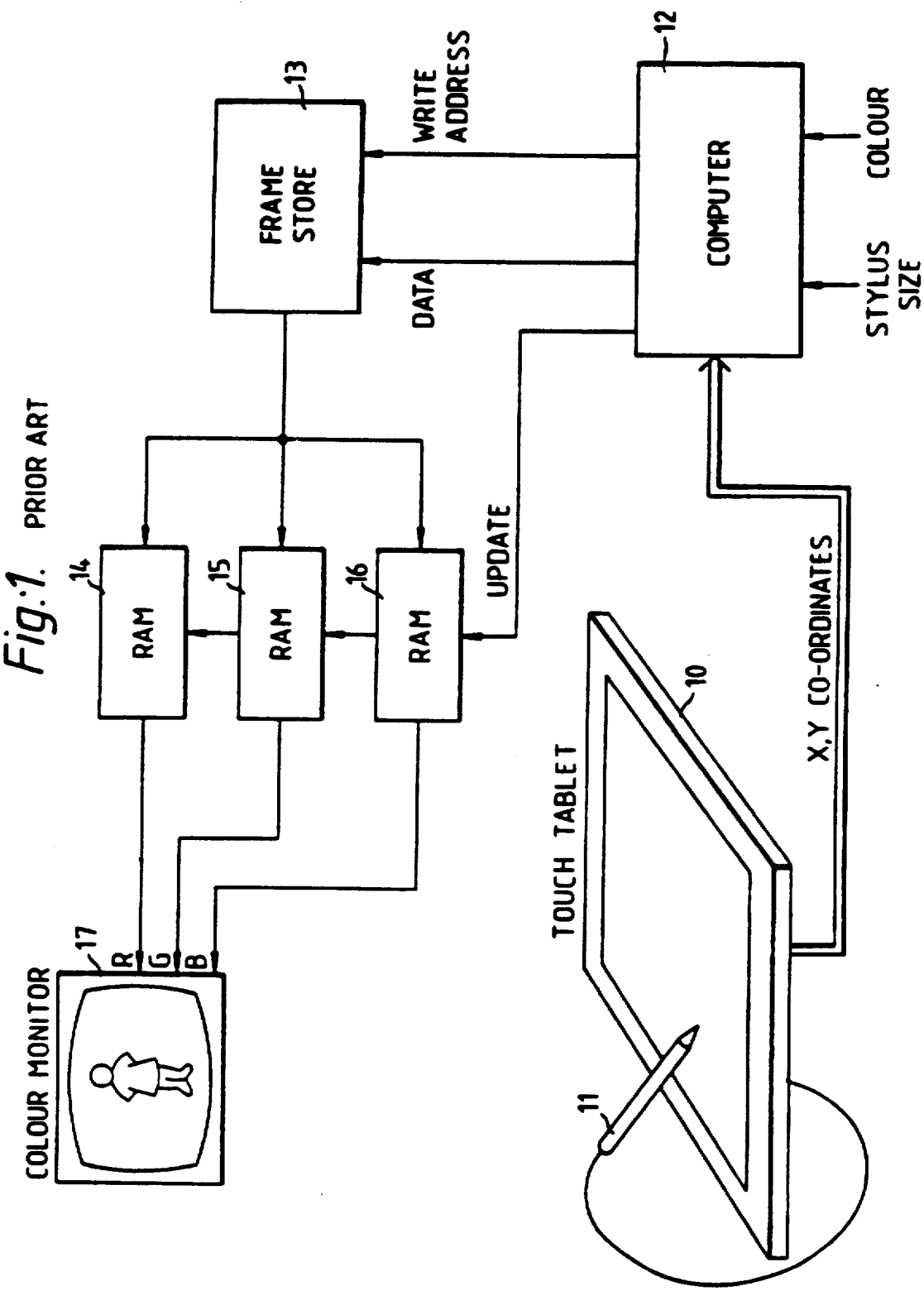
FIG. 1 shows a known picture creation system.
Figure 2:
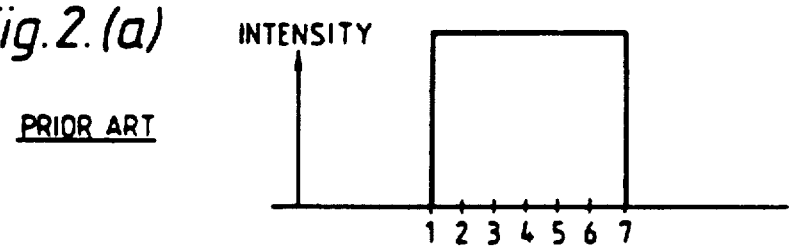
FIGS. 2A and 2B show a graphical comparison between the intensity of prior art arrangement and one of the considerations of the present invention.
Figure 2:
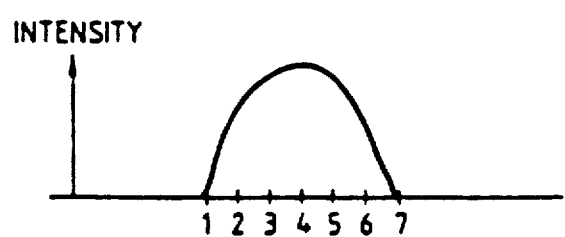

As already described with regard to the prior art arrangement of FIG. 1, such a prior art system can designate the stylus size but the resulting image drawn via this stylus is rather impressionistic due to the hard electronic lines. Considering this prior art system operating in black and white (monochrome) then assuming the stylus width to have been selected to be 7 picture points (centred on picture point 4) then the intensity will correspond to that shown in FIG. 2(a). In order to move towards a more natural image, the first consideration was to vary the intensity so that it was reduced towards the edges of the stylus as shown in FIG. 2(b). The shape was initially calculated by considering a cylinder projected onto a matrix of pixels. In the centre there is full intensity but at the edges where the cylinder only partially covers a pixel a correspondingly reduced intensity is used. Whilst this gives the correct softening effect to the edges to provide an improved image on a raster display, this only goes some way to overcoming the problem as the algorithm has no knowledge of the background and consequently produces a halo effect.

It has been found that in order to produce a more realistic image it is necessary to provide a contribution from the 'background' on which the image is drawn when synthesising this image. The background can correspond to the paper or can be part of the image already created. The reasons for this approach will now be described.

Considering the stylus as though it were a pencil which can simply be considered to be a point drawn across the paper to form lines. However on further investigation this was found to be only partially true since, the end of the pencil has a 'distribution' and this distribution varies whether it is a lead pencil, a coloured pencil, a crayon or charcoal or other implement. Thus, if a system is to be built that successfully emulates the artists tools, as the stylus is moved across the touch tablet, it must not just fill the pixels corresponding with its address with the appropriate colours, it must form a distribution around the point in question just as the real life pencil, crayon or charcoal does.

If the stylus is now considered as if it were a paint brush then further aspects need investigation, since the type of paint it is carrying also matters. A brush fully loaded with poster paint is very similar to the pencil situation since it simply replaces the colour of the paper with that of the paint according to a certain distribution. However, water colours and oil paint depend not only on what paint is loaded on the brush but also what paint is on the paper. The brushes still have distributions but not the simple type of the pencil that has one simple peak, the brush can have many peaks (the stipple), lines (the oil), or just a single peak (the traditional camel hair) but all have little or no temporal content.

Thus we have found that instead of having to write just one point or several points of equal value for each position of the stylus on the touch tablet, a distribution of luminance and chrominance levels have to be written around the point in question to simulate the action of the pencil or paint brush. At the extreme edge of the influence of the pencil there is a very small contribution from the pencil and a large contribution from the background whilst at the centre of the pencil, the contribution is nearly all from the pencil.

Figure 3:
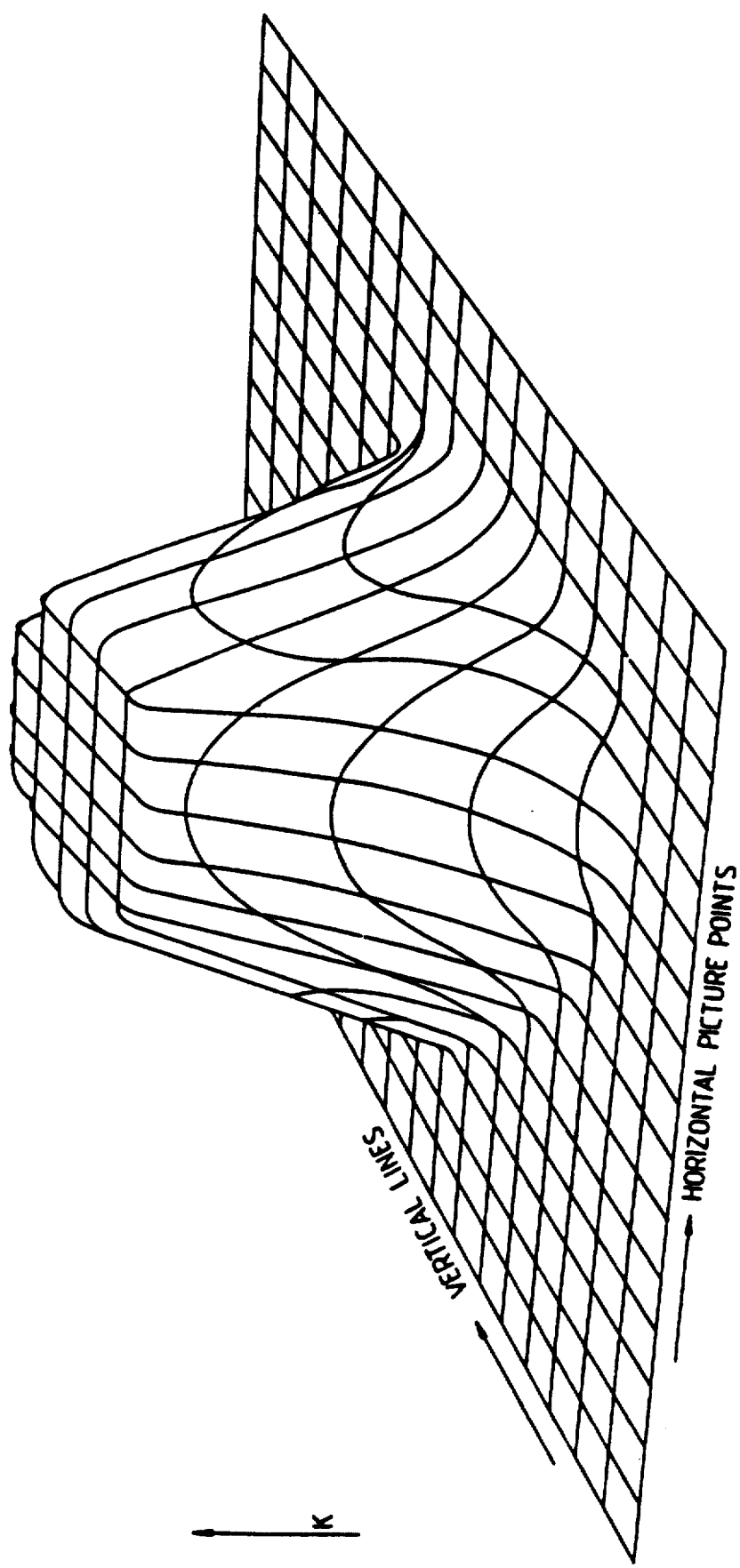
FIG. 3 shows an example of contribution from a pencil.

Considering FIG. 3, the small squares represent picture points and the vertical axis the contribution from the pencil. The curve shown could be typical for a broad pencil whereas FIG. 4 more accurately shows a narrow fine point pencil.

Figure 4:
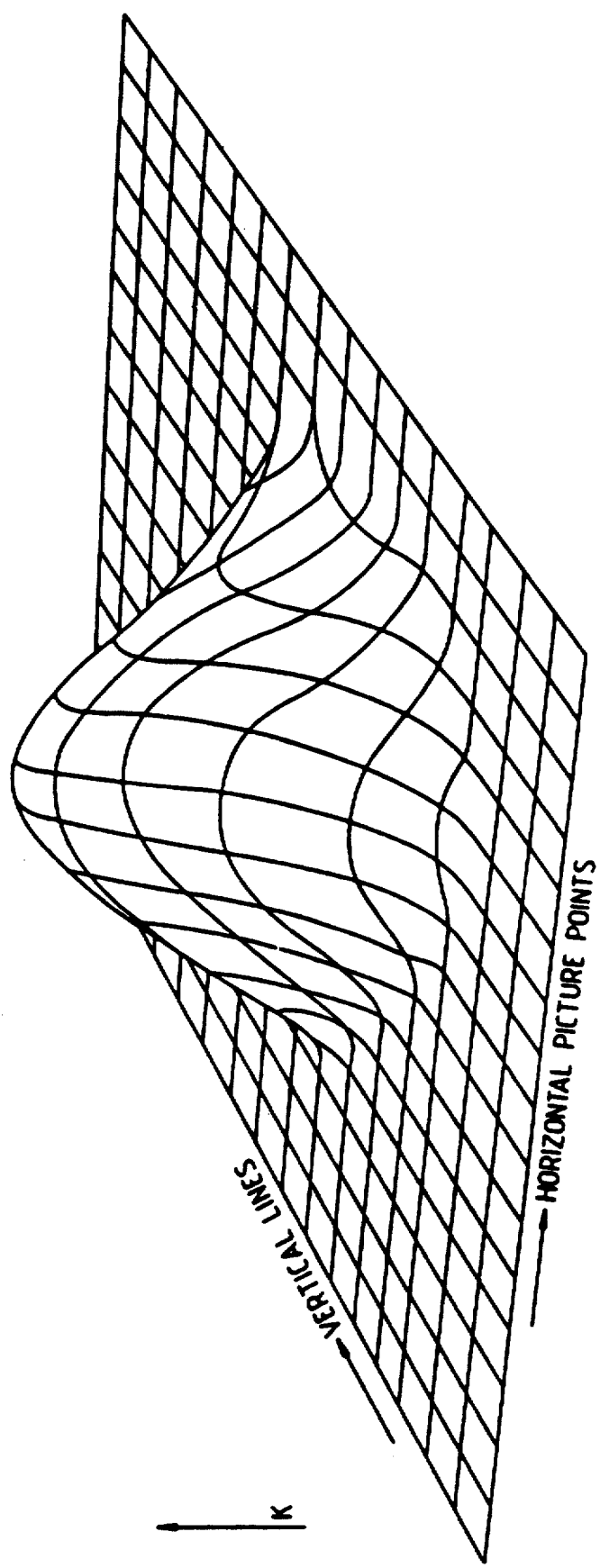
FIG. 4 shows another example from a more pointed pencil.

The contribution (K) for the pencil in FIGS. 3 and 4 is complemented by the contribution supplied by the background, which background may be the paper or the pencilled image already laid down. In other words, as the contribution from the pencil decreases, the contribution from the background increases and vice versa. Thus information on this background must therefore be made available during image synthesis.

In the situation where the shape is calculated from a cylinder, as mentioned above, this in practice produces a sharp pencil like result when handled by the raster display. The uniform 'height' of the unquantized cylinder chosen effectively defines the contribution value (K).

Figure 5:
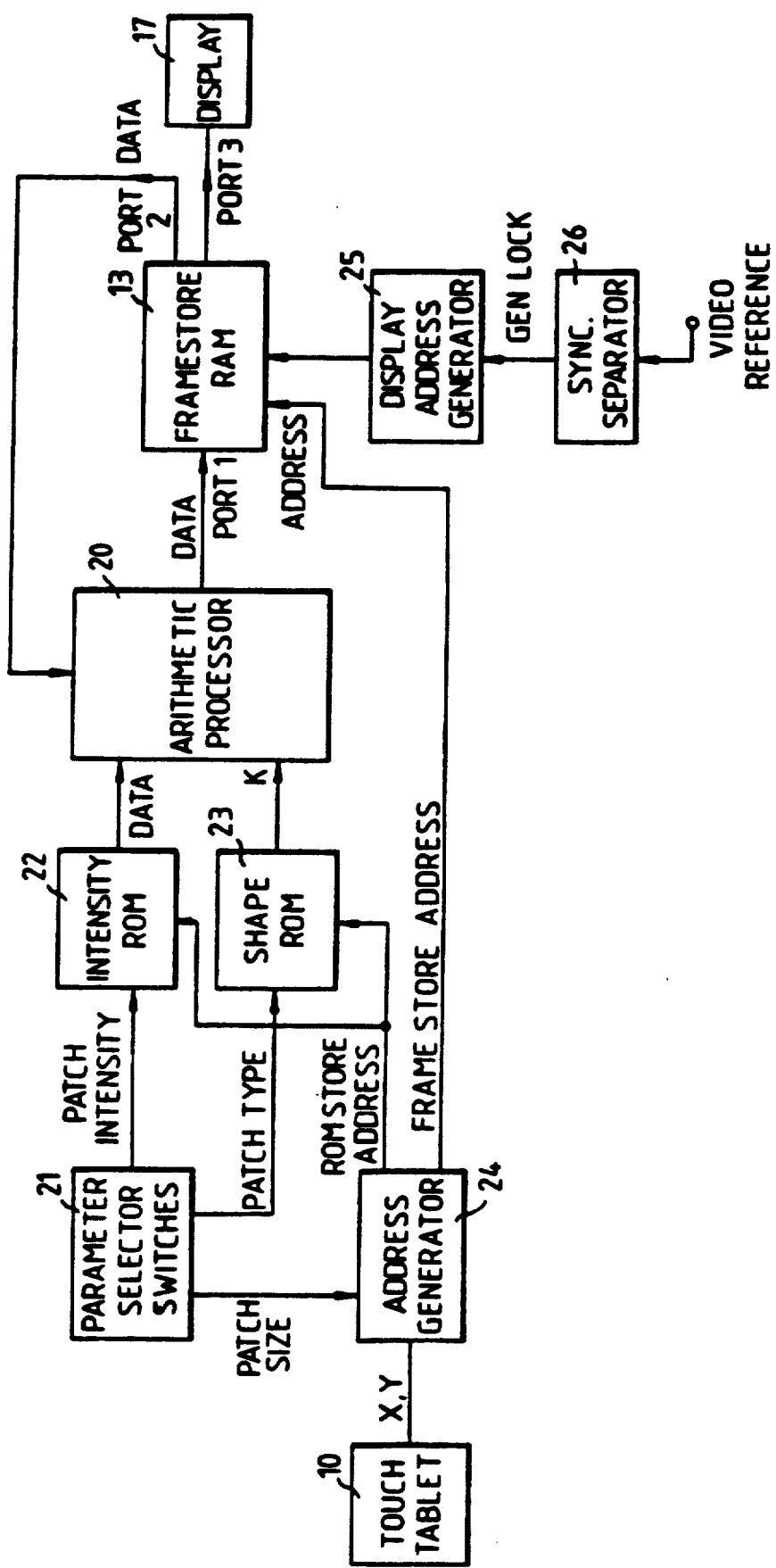
FIG. 5 shows one embodiment of the system of the present invention.

One arrangement for producing the image creation system of the invention is shown in FIG. 5. In order to simplify understanding of the operation, the system will be described initially as operating in black and white (monochrome) so that only variation in intensity will be considered. Colour operation is discussed in more detail later.

The touch tablet 10 is provided as before with its associated stylus and the x and y coordinates fed to address generator 24. The desired implement is expediently selected by means of the switches 21.

These switches can take the form of standard digital thumbwheel switches for example, so that setting to a particular number gives an output indicative of the chosen implement and colour (or intensity in the monochrome case) from those available to the user. Examples of typical implement shapes have been illustrated in FIGS. 3 and 4 and these would be pre-stored in ROM store 23 and the selected item made available therefrom on a picture point by picture point basis by means of the address generator 24. This store 23 effectively gives the value of K for any given picture point within the selected patch. A similar operation occurs also for the intensity value selected from those available within ROM store 22 (see also the schematic illustration of FIG. 6), The distribution data for the contribution coefficient K for a given implement with values corresponding for example to those shown in FIGS. 3 and 4 read out from the shape ROM 23 will thus vary picture point by picture point in this predetermined manner. In addition intensity data will be read out from ROM 22 for processing by processor 20. The size of the area of interest for a given implement is expediently passed to the address generator 24 as shown to ensure that the number of picture points processed adjacent a given coordinate is kept to a minimum to ensure maximum processing speed.

The processor 20 not only receives data from ROM22 but also from frame store 13 which processor uses a portion of the new data with previously stored data, the proportion being determined by the value of K at any given time. The desired (read) addresses from the frame store are accessed by means of the address generator 24 as are the addresses in which the processed data is to be stored. Thus the information not only flows as simulated to the store (as in the prior art case) but flows from the store for processing which may be termed as a "read-modify-write" process. Whilst the picture build up is continuing, the progress is continuously available to monitor 17 by using a three port frame store arrangement as shown which includes a seperate display address generator 25 for sequentially addressing the framestore 13 to gain access to the stored data for monitoring. The address generator 25 is shown under the control of sync separator 26 which receives information from a video reference source in normal manner. Thus framestore 13 allows access for processing so as to read and write to every point essentially at random and a video output port that can display the contents of the frame store at video rates.

Figure 6:
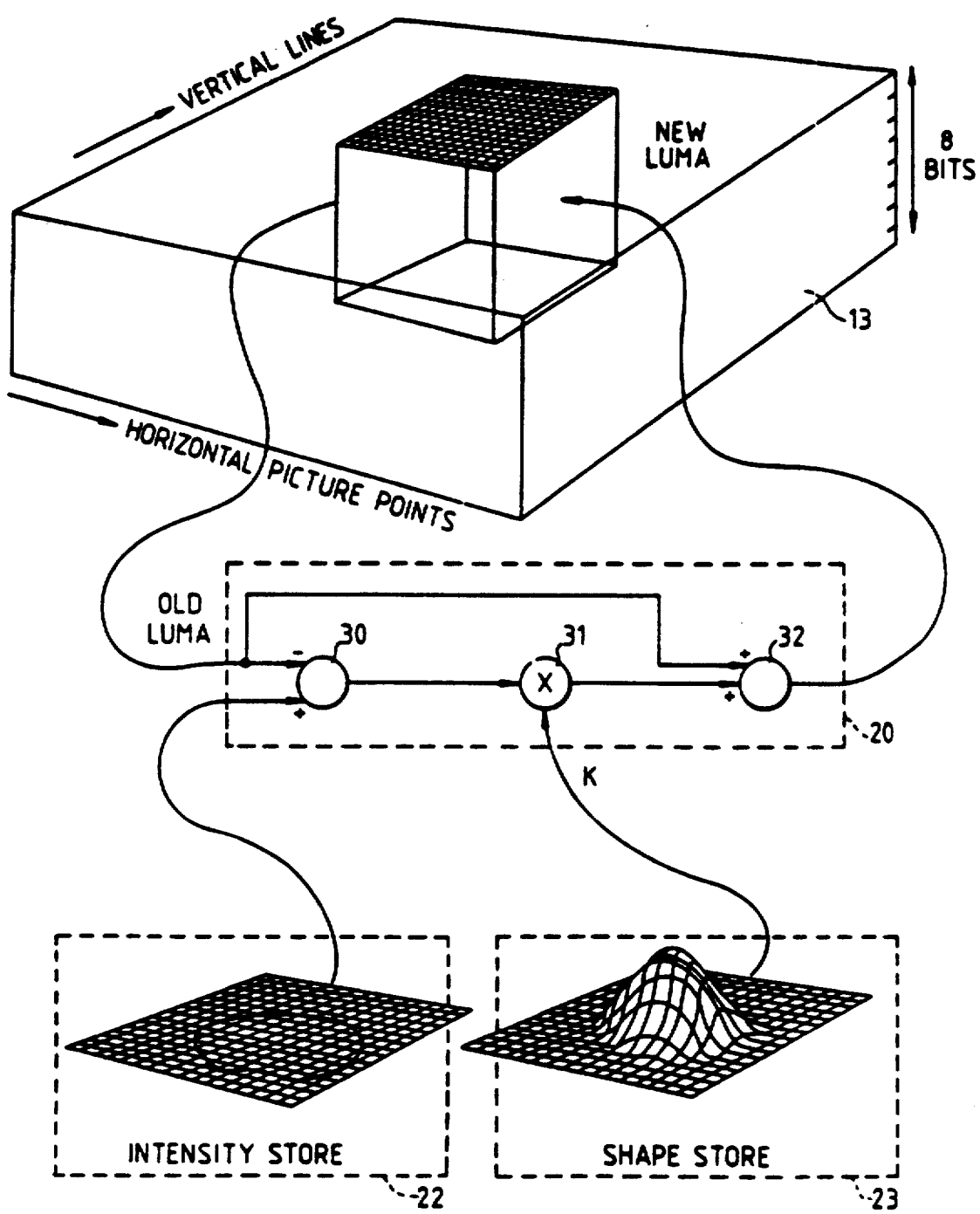
FIG. 6 shows an example of the operation of the processor of FIG. 5.

An example of the arithmetic processing of the data is illustrated in FIG. 6. The pen "shape" distrubution and the intensity are shown schematically coming from stores 23 and 22 respectively. There is, of course, no reason why, in the electronic case, the intensity (or in the expanded colour system, the colour) has to be constant across the brush and thus the pen colour or intensity data stored takes on similar proportions to the pen shape data stored.

The algorithm for filling the picture store 13 contents as the stylus is moved is:

$$LUMA_{(NEW)} = K \cdot P_L + (1 - K) \times LUMA_{OLD}$$
$$= K \cdot (P_L - LUMA_{OLD}) + LUMA_{OLD}$$

Where $K \leq 1$ and represents the contribution on a point by point basis of the pen shape.
$P_L$ is the Pen intensity and represents a value of Luminance.
LUMA is the picture store content This algorithm is realised by the processor 20.

The patch of 16×16 pixels is shown to be large enough to encompass the desired pen shape. The processor hardware for handling this particular algorithm comprises a subtractor 30 (e.g. 74S381), a multiplier 31 (e.g. MPY-8HuJ/TRW) and an adder 32 (e.g. 74S381). The peak of the pen shape is central of the patch in this instance and will produce the maximum value of K at this point. The x and y coordinate provided by the touch tablet will correspond to the corner of the patch read out from the store and processing of all points within this patch is effected and the modified data written back into the store 13. During this processing the old luminance value and the designated intensity value are subtracted and the difference multiplied by coefficient K, the value of K being dependent on where the particular picture point lies within the selected patch. The result is added to the earlier luminance data. It is clear that some picture points at the periphery will remain unchanged in this example. Movement of the actual stylus on the touch pad by one picture point will cause a new patch to be read out from the store 13 which will contain most of the earlier picture points but 16 new picture points will be present and naturally 16 others will have been omitted. The processing will again be carried out for the entire patch. During a particular drawing sequence there will usually be no change in the contents of stores 22 and 23, but the patch from frame store 13 will be changing in dependence on the movement of the stylus. It can be seen that during the second processing operation just described, the previous movement by 1 picture point will cause a proportion of the luminance information generated by the earlier processing operation to be used in the calculation of the new content for the updated patch.

The processor 20 is realised in purpose-built hardware to enable the processing speeds to be achieved in a sufficiently short space of time to provide the real time operational requirements which are beyond normal computational speeds.

The number of processing steps for a given coordinate will depend on the size of the patch accessed.

Thus, if the patch was say 32 picture points wide and 32 high there are 32×32 or 1024 points to be processed for each movement of the stylus. A reasonable update rate for the stylus would be 500 times per second or better and this figure results in a processing speed of approximately 2 μsec per point.

The size of the patch or square of pixels removed from the main picture store 13 must be the same size as that accessed from the pen intensity and the pen shape stores 22 and 23. Thus the latter stores only have a capacity of a few picture points wide and high for any given pen intensity and shape.

Figure 7:
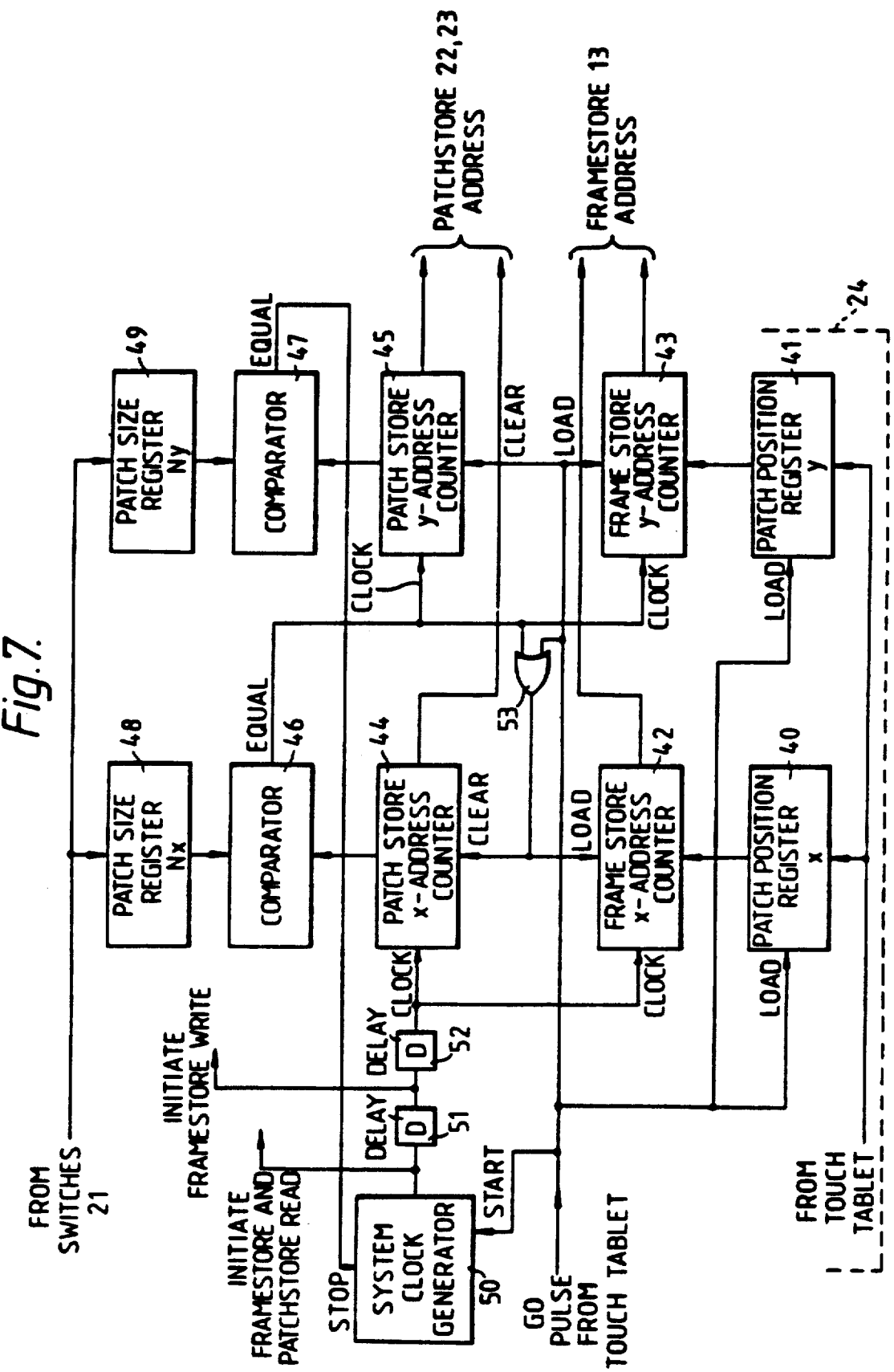
FIG. 7 shows the store addressing operation in more detail.

The patch size can be made variable dependent on requirements as already described with regard to FIG. 5 and the address generator 24 thereof operates to select the desired location accordingly. An embodiment of this address generator will now be described with reference to FIG. 7.

A system clock generator 50 in conjunction with the normal 'go' pulses resulting from the stylus contact with the touch tablet, control the addressing operation for processing. A 'go' pulse from the touch tablet loads the x and y coordinates therefrom into registers 40 and 41. These values are passed across for loading into the x and y frame store address counters 42, 43 to define the start of the addressing within the given patch at the same time the two patch store address counters 44 and 45 are cleared (counter 42 being loaded and counter 44 being cleared respectively via OR gate 53). The go pulse from the touch tablet also initiates the clock generator 50 which produces pulses at a repetition rate sufficiently spaced to allow the processing within the processor 20 of FIG. 5 to be effected before the next pulse is produced (e.g. 500 μS). Thus the first pulse from generator 50 passes to initiate a read operation from frame store 13 and patch stores 22 and 23 at an address defined by the outputs of counters 42, 43 and 44, 45 respectively and schematically represented in FIG. 6. A delay 51 is provided to allow sufficient time for the read operation and the processor 20 to process the data from the first pixel location within the patch with the intensity data and associated contribution value before a write pulse is produced to initiate writing of the processed data back to the frame store 13 so as to L effect the 'read-modify-write' sequence. A further delay 52 is provided to allow time for the writing operation to be completed before the clock pulse passes to increment the addresses within the framestore x address counter 42 and the patch address counter 44 for the next cycle.

The x and y size of the patch selected by switches 21 of FIG. 5 is held in the registers 48 and 49 respectively. These values are passed to comparators 46 and 47 respectively so that the current count within counters 44 and 45 can be compared to determine when the desired patch has been fully addressed. Thus after a given number of clock pulses equal to the number of pixels in the x direction for a patch (Nx) when the output from patch address counter 44 becomes equal to that from ROM 48, the output of comparator 46 will change causing patch counter 44 to be cleared and frame store x address counter 42 to be reloaded with the x ordinate from register 40. At the same time the frame store y address counter 43 and patch store y address counter 45 are incremented so that all the pixels in the x direction in that patch are addressed, processed and rewritten into the frame store for the next y location in the patch. These steps continue until eventually the y address count within counter 45 will become equal to that output from ROM 49 and this will be detected by comparator 47 indicative that all the pixels within the patch have been processed. This equality causes the stopping of clock generator 50.

When the stylus is moved to the next adjacent x,y coordinate this value will be available at the inputs to registers 40 and 41 and the accompanying go pulse will cause the whole operational cycle to proceed once again, this time for a patch moved by one pixel in either the x or y direction dependent on how the stylus was moved.

By using dedicated hardware for the processing it is possible to read, process and rewrite a patch of $16 \times 16$ pixels in only 350 $\mu s$ approximately which is sufficiently rapid to follow normal stylus movements without fears of falling behind in the processing.

Thus due to the speed of processing, the system will respond seemingly instantaneously for all brushes or other artists implements up to the largest. For very large brushes a patch of $16 \times 16$ or even of $32 \times 32$ is too small and either larger patches or multiple writing has to be considered and this causes a slowing of the action. However, the larger the brush the slower the action is not dissimilar to working with a real life brush and is, therefore, quite acceptable. In order that this slowing up of the brush does not happen in unnatural steps the size of the patch is made only as large as is necessary for the brush being used and will track the change in size as required.

Although the picture point data is shown in store 13 of FIG. 6 as being defined to 8 bit resolution, in practice increasing the resolution to up to 16 bits will result in a picture of higher quality being obtained if this refinement is required. The bit handling capacity of the stores and processing will accordingly require expansion.

Although the resolution of the raster display is only $512 \times 768$ pixels, for instance, to enhance quality, the pen position (x and y) is preferably known to say an accuracy of 8 times this value (i.e. to ⅛th of a pixel in each direction). The cylinder shape described above for example can in practice be placed upon the pixel matrix to an accuracy of ⅛th pixel as the touch tablet is inherently capable of defining the stylus coordinates to such accuracy. Thus 64 (i.e. $8 \times 8$) placements of the cylinder each resulting in a different brush shape can be stored in store 23 and the appropriate one used dependent on the fractional parts of the coordinate given by the touch tablet and therefor results in an effective brush position accuracy of 8 times better than the original pixel matrix. The patch store capacity and that of the address generator will require adjustment accordingly.

The brushes and pencils described so far have no temporal nature, if the stylus is held steady over a point, nothing additional happens with time. However, in the case of the airbrush the longer it is held over a point the greater the build up of paint. This modification can simply be applied to the algorithm of FIG. 6 by choosing a touch tablet/stylus combination which produces a pulse train whilst held at a given coordinate location (rather than the single 'go' pulse as discussed above). This allows the train of go pulses to each initiate the 'read-modify-write' operation described in relation to FIG. 7.

Figure 8:
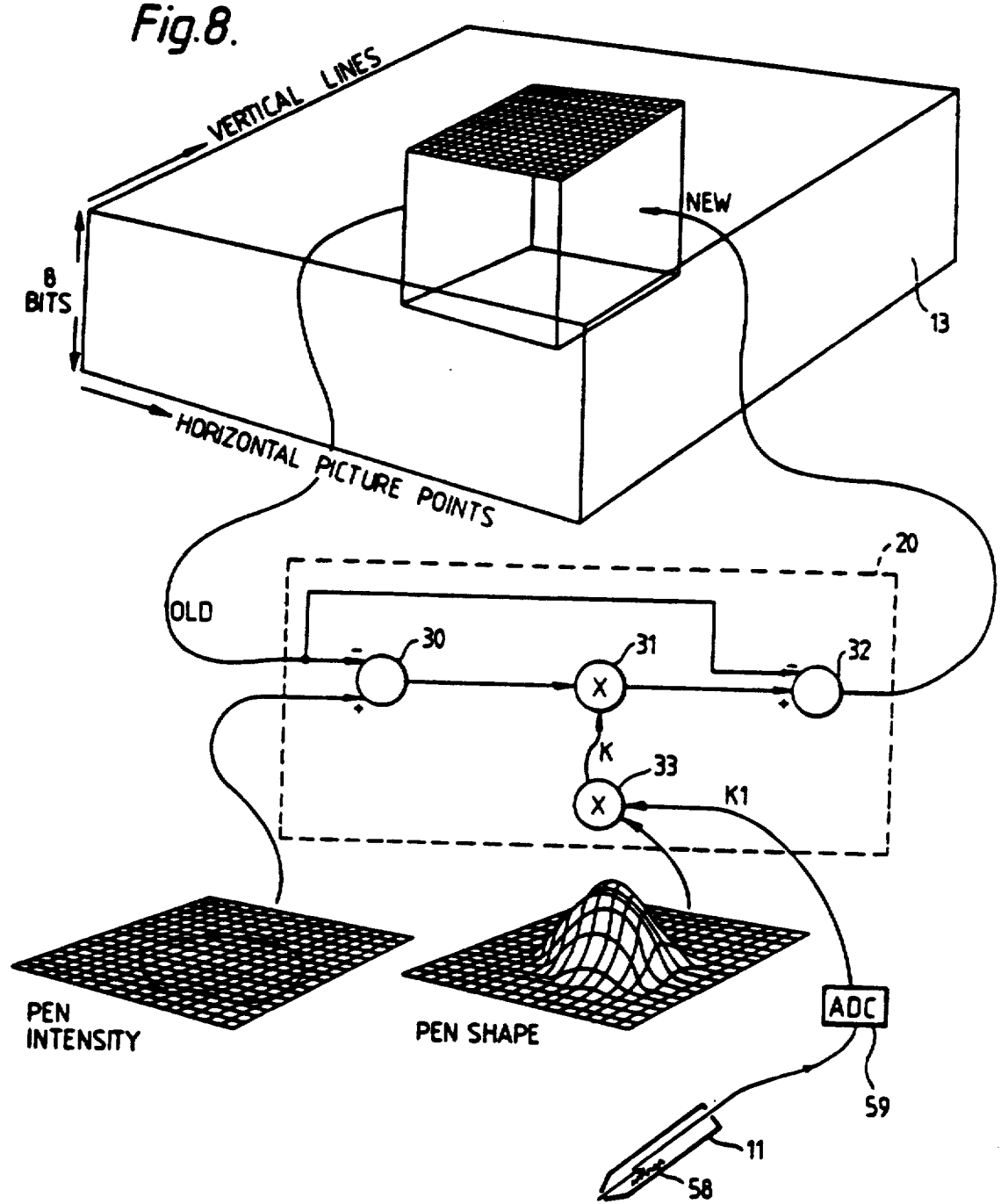
FIG. 8 shows an alternative processing operation to that of FIG. 6.

The system can be made to simulate even more realistically by adding the dimension of "pressure". The texture of the artists tool changes with pressure and thus is a pressure sensitive device were fitted to the point of the stylus then this could be taken into account when setting the pen shape stores. Alternatively, a second multiplier can be added to the standard algorithm between the pen shape store and the processor as now shown in FIG. 8 with additional multiplier 33. The stylus 11 is shown schematically with an integral spring loaded potentiometer 58 which includes a wiper contact which will produce a voltage Vp dependent on the tip pressure. This voltage is converted via ADC 59 to the value $k_1$. Thus if little pressure is being used coefficient $k_1$ is small and if high pressure is employed, K tends to 1.

Figure 9:
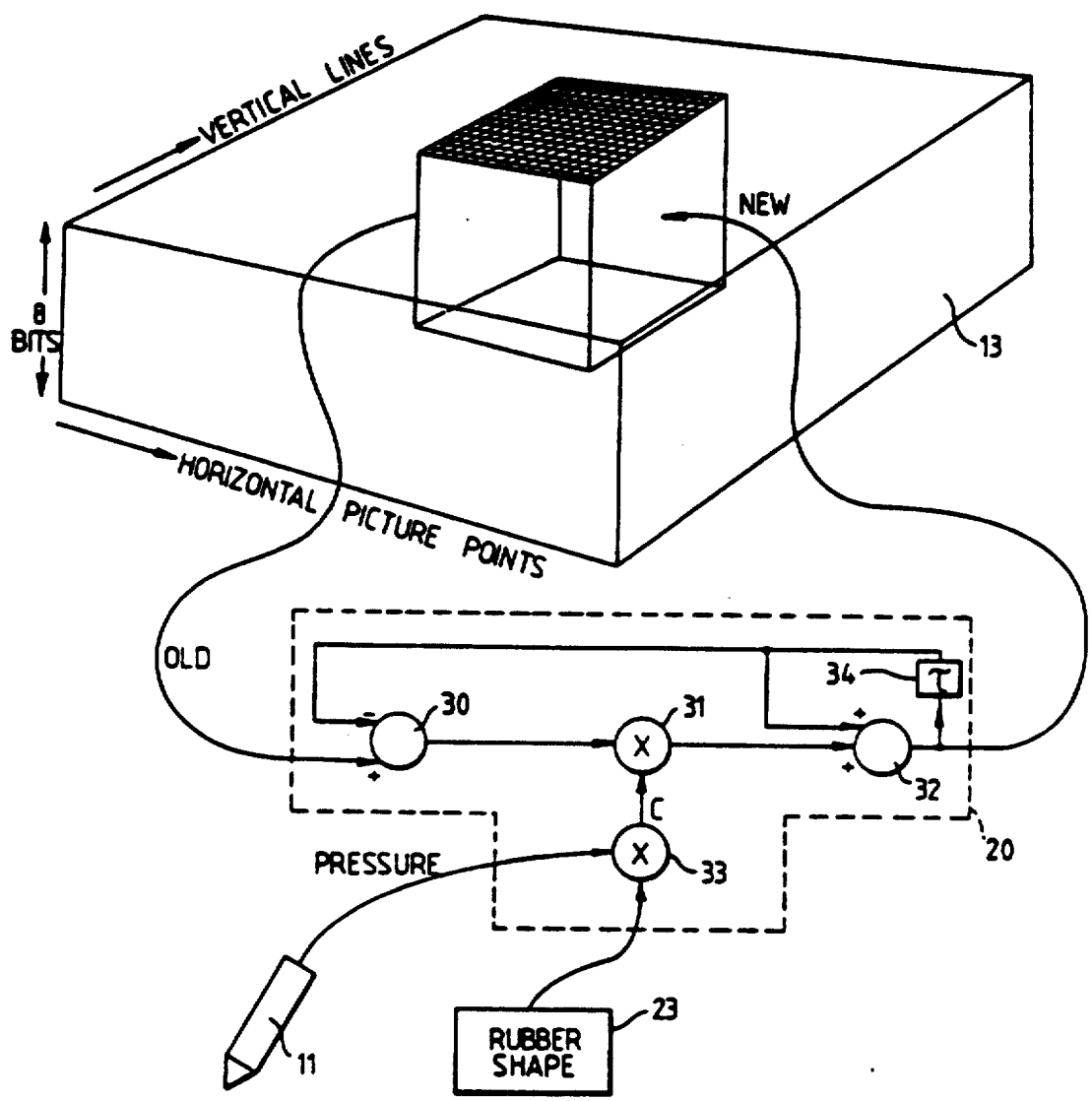
FIG. 9 shows a further alternative processing function.

A further refinement of the machine is to simulate the action of a light rubber or, in the water colour case, clear water by allowing a blurring facility. This can be achieved by modifying the processor of FIG. 6 to operate as an accumulator to allow recursive low pass filtering on the patch as shown in FIG. 9. This allows a contribution from adjacent picture points within the patch to be provided when calculating the intensity of a particular picture point.

The processor 20 includes subtractor 30, multiplier 31 and adder 32 as before. The old data is received by subtractor 30 where delayed data from delay 34 is subtracted therefrom. The result is multiplied by coefficient C in multiplier 31. The output from the multiplier is added in adder 32 to the delayed data from delay 34. The hardware of this processor acts as the desired accumulator with the value of C determining the degree of smearing. If the delay period $\tau$ is selected to equal 1 picture point then horizontal smearing takes place. If $\tau$ equals 16 picture points then vertical smearing takes place. This delay can be selected using thumbwheel switches for example. As shown the value of C can, if desired, be variable in regard to both the shape of the rubber say (made available from store 23) and the pressure of application of the rubber (made available from stylus 11) by using the further multiplier 33.

Although the distributions of FIGS. 3 and 4 are somewhat symmetrical, with other configurations this need not be so. Thus for a stipple brush for example, a number of peaks will be present.

Figure 10:
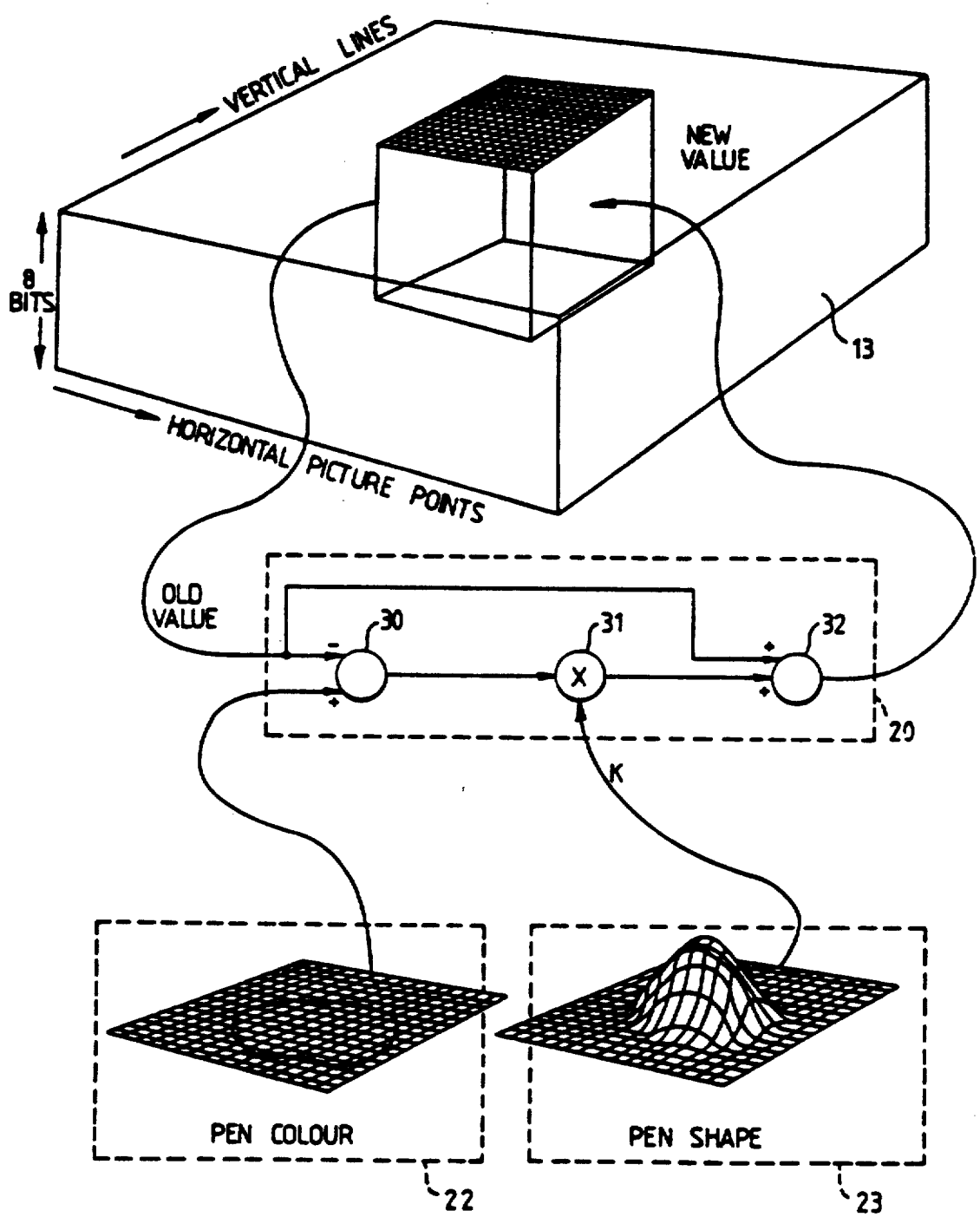
FIG. 10 shows a configuration employed for a partial colour system.

Although the system has been described for ease of explanation as achieving a monochrome operation, in practice the system would adapt to generate colour images. A first step would be to provide a 'partial colour' system using memories along the lines of FIG. 1. In such a situation the processing requirement is shown in FIG. 10. The intensity values used from store 22 are now defined as colour values and processed values derived therefrom will be converted into actual colour values on read out from the frame store (as in FIG. 1).

There is of course, no reason why, in the electronic case, the colour has to be constant across the brush and thus the pen colour store can take on similar proportions to the pen shape store.

Thus, the algorithm for filling the picture store contents as the stylus is moved is now:

$$VALUE_{new} = K.P_c + (1-K) \times VALUE_{old}$$

Where K<1 and represents the contribution on a point by point basis of the pen shape.

$P_c$ is the Pen colour and represents a value of Hue, Saturation and Luminance.

VALUE is the picture store content for that particular picture point.

With a partial colour system, difficulties can arise since 'intensity' produced by the algorithm may appear as 'colour' incorrectly. Special luminance values must be 'reserved' to avoid this degradation.

Figure 11:
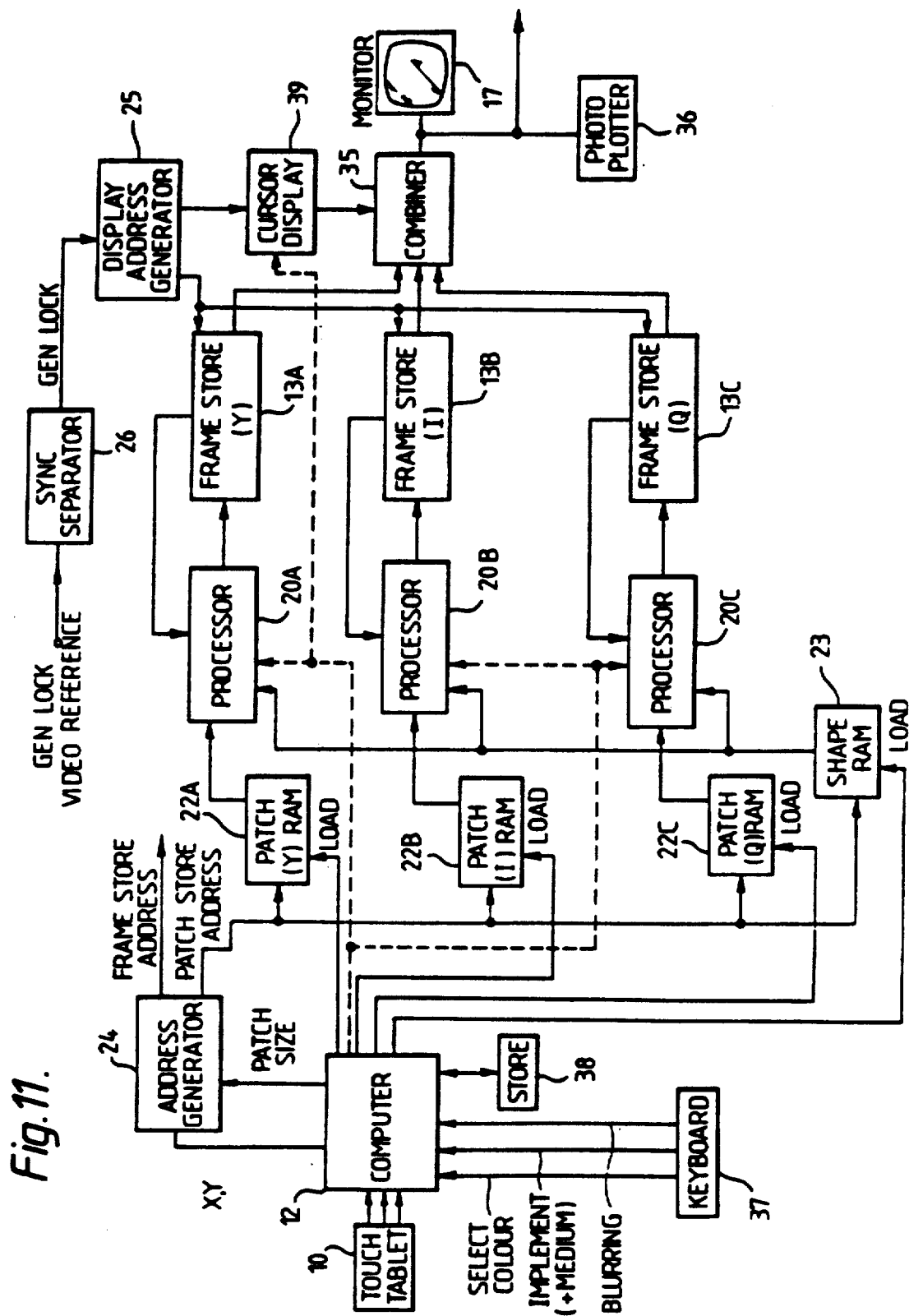
FIG. 11 shows an expanded arrangement capable of providing full colour processing.

In order to provide a full range of hues, saturations and luminance levels however a system with three frame stores and associated processing would be preferable as shown in FIG. 11. These would handle the luminance and colour difference (i.e. Y, I and Q) components respectively.

Thus three frame stores 13A-13C are shown with associated processors 20A-20C, for the respective Y, I and Q components.

The processed data held in the various frame stores is passed to combiner 35 where the luminance and colour difference information is combined to provide full colour video for the monitor 17. The read and write addressing respectively of the frame stores will be common to each store and is supplied by address generator 24 as before. The patch store addressing will be common to the patch stores 22A-22C and 23. As now shown in FIG. 11 where there is a number of selections for the various parameters it is convenient (as an alternative) to replace the switches 21 of FIG. 5 with the computer 12. Thus a given colour or implement for example can be selected on the computer keyboard 37. By using RAMs instead of ROMs for the patch stores 22, 23 allows a greater number of variations to be conveniently dealt with, as any one of a number of colours or shapes stored in bulk computer store 38 can on operating the keyboard 37 be loaded via computer 12 into the designated RAM. Thereafter the stores 22, 23 are effectively used as a ROM until a new colour or shape is selected, at which time the RAMs are written into with updated parameters. The storage capacities of the stores 22, 23 need only be equivalent to the maximum brush size required (defined to pixel or sub-pixel accuracy). The patch size and x,y coordinates can also be passed via the computer. Time information from the touch tablet and pressure information from the stylus for example can also be passed conveniently via compute 12 to the processors 20A-20C as represented by the broken lines.

As the computer is only being used for switching and routing operations as an optional alternative to the thumbwheel switch configuration described earlier and not for processing, its speed limitation is not a problem in the present system.

As shown a cursor display block 39 may be included to indicate, on the monitor 17, the position of the stylus. The cursor block may include an offset device controlled by the patch size information available via the computer so that the cursor is offset to indicate the centre rather than the corner of the patch.

The system described is not restricted to use in the broadcasting art alone. After completion of the creation process the image may be converted into hard copy for example using the photoplotter 36 so that it can be used as normal artwork for magazines and so on.

With the addition of other peripherals (e.g. modem) the image could be directly relayed to remote locations or recorded onto disc for transportation to a remote location or for future use.

Thus a full range of options are open to the operator and are shown as inputs to computer 12 and include colour selection, implement and medium, pressure, time of application (for airbrush etc.) and blurring of the eraser or water colour simulation. It has been found that the system produces extremely good artistic results.

Although the system has been described as using a touch tablet, other possibilities exist for generating the x and y coordinates.

The algorithms described above may alternatively be generated by a rapidly operating dedicated microprocessor, although this may result in some loss of computational speed.

Although the FIG. 11 arrangement has been described generally in terms of NTSC colour components, it can equally apply to PAL colour components or RGB.

I claim:

1. A process comprising:
   using a pen-tablet unit and a circuit coupled to said unit and responsive to a user's actions on at least the pen to generate progressively varying position and blend information;
   providing first brush information identifying at least one of a selected color and a selected intensity, second brush information identifying a selected size, and third brush information related to a distribution of a selected parameter related to said size;
   providing an image store for pixel data representing image pixels;
   carrying out processing operations in response to said position information comprising retrieving from the image store pixel data for image pixels which are in a selected image area identified through use of said position information and said second brush information, calculating new pixel data for the selected image pixels by using the retrieved pixel data generally increases in moving from the periphery over a selected distance toward the center of said selected image area, and writing the calculated new pixel data into the image store in place of the retrieved pixel data;
   tensity information used in calculating new pixel generally increases in moving from the periphery over a selected distance toward the center of said selected image area, and writing the calculated new pixel data into the image stores in place of the retrieved pixel data;
   wherein the pixel data retrieved from the image store and used in the calculation of new pixel data in each successive processing operation includes pixel data calculated and written into the image store in the course of the preceding processing operation; and
   displaying an image corresponding to pixel data in the store on a raster scan display screen.

2. A process as in claim 1 including converting pixel data from the image store into a hard copy image.

3. A process as in claim 2 in which the converting step comprises using a photoplotter to generate said hard copy image.

4. A process as in claim 1 in which the step of using the circuit responsive to pen position comprises generating pen position information to a resolution substantially higher than that of the image data.

5. A process as in claim 4 in which the step of using the circuit responsive to pen position comprises generating pen position information to a resolution which is 8 times higher along each of two orthogonal directions than that of the image data.

6. A process as in claim 1 in which the color/intensity information and the image pixels are in component video format and the step of carrying processing operations carries out respective processing operations in at least two processing channels for respective color components of component video.

7. An image creation apparatus comprising:
a pen and a tablet for use by an artist in creating an image and a circuit coupled to at least one of the pen and the tablet and responsive to artist's actions on the pen during pen stroke on the tablet to generate pen position information and blend information variable over a range between a minimum and a maximum blend;
a circuit providing first brush information related to at least one of a selected color and a selected intensity, a second brush information related to a selected size, and a third brush information related to a distribution of a selected parameter in a space;
an image store for pixel data representing image pixels;
a processor coupled to said circuits to receive said pen position and blend information as well as said first, second and third brush information, and coupled with said image store to retrieve pixel data from the store and to write pixel data into the store; said processor comprising processing circuits carrying out processing operations in response to said position information in which the processor retrieves from the image store pixel data for selected image pixels which are in a selected image area identified through use of said pen position information and said second brush information, calculates new pixel data for the selected image pixels by using the retrieved pixel data and the color/intensity information in proportions which are determined in accordance with the third brush information and the blend information and vary at least over a peripheral portion of said selected image area such that the proportions of color/intensity information used in calculating new pixel data generally increases in moving from the periphery over a selected distance toward the center of said selected image area, and writes the calculated new pixel data into the image store in place of the retrieved pixel data;
wherein the pixel data which the processor retrieves from the image store and uses in the calculation of new pixel data in each successive processing operation includes pixel data which the processor has calculated and written into the image store in the course of at least one preceding processing operation; and
a display screen coupled to said store to display an image corresponding to pixel data in the store.

8. An apparatus as in claim 7 including a hard copy generating device coupled to said store to produce a hard copy image corresponding to pixel data in the image store.

9. An apparatus as in claim 7 in which said hard copy device comprises a photoplotter.

* * * * *

UNITED STATES PATENT AND TRADEMARK OFFICE
CERTIFICATE OF CORRECTION

PATENT NO. : 5,289,566

DATED : February 22, 1994

INVENTOR(S) : Ian C. Walker, Richard J. Taylor, Anthony D. Searby, Paul R.N. Kellar It is certified that error appears in the above-identified patent and that said Letters Patent is hereby corrected as shown below:

Column 10, line 47, after "data" insert -- and the first brush information in proportions which are determined in accordance with the third brush information and blend information and vary at least over a peripheral portion of said selected image area such that the proportions of color/intensity information used in calculating new pixel data --.

Column 10, delete lines 52 through 57.

Signed and Sealed this

Sixteenth Day of May, 1995

Attest:

BRUCE LEHMAN

Attesting Officer     Commissioner of Patents and Trademarks